United States Patent
Vorobyev

(10) Patent No.: US 9,575,532 B2
(45) Date of Patent: Feb. 21, 2017

(54) DEVICE, METHOD, AND SYSTEM FOR REPORTING DEVICE STATE INFORMATION TO A SERVER

(71) Applicant: Konstantin Vorobyev, Tokyo (JP)

(72) Inventor: Konstantin Vorobyev, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 183 days.

(21) Appl. No.: 14/338,760

(22) Filed: Jul. 23, 2014

(65) Prior Publication Data

US 2015/0033043 A1    Jan. 29, 2015

(30) Foreign Application Priority Data

Jul. 29, 2013 (JP) ................................. 2013-156949

(51) Int. Cl.
| | | |
|---|---|---|
| G06F 1/00 | (2006.01) | |
| G06F 17/00 | (2006.01) | |
| G06F 15/16 | (2006.01) | |
| G06F 11/00 | (2006.01) | |
| G06F 1/26 | (2006.01) | |
| G06F 17/30 | (2006.01) | |
| H04L 29/08 | (2006.01) | |
| G06F 1/32 | (2006.01) | |

(52) U.S. Cl.
CPC ......... G06F 1/266 (2013.01); G06F 17/30368 (2013.01); G06F 17/30575 (2013.01); *G06F 1/3284* (2013.01); *H04L 67/1095* (2013.01)

(58) Field of Classification Search
CPC  H04L 67/1095; G06F 1/266; G06F 17/30575; G06F 17/30368; G06F 1/3284

USPC ....... 713/310; 707/610; 709/217; 714/20, 22
See application file for complete search history.

(56) References Cited

U.S. PATENT DOCUMENTS

| | | | | |
|---|---|---|---|---|
| 2001/0049263 | A1* | 12/2001 | Zhang ...................... | G06F 8/65 455/67.11 |
| 2004/0078655 | A1* | 4/2004 | Sung ........................ | G06F 1/30 714/14 |
| 2009/0063901 | A1* | 3/2009 | Suzuki ................ | G06F 11/1443 714/25 |
| 2009/0222403 | A1* | 9/2009 | Kato ................... | G06F 11/0733 |
| 2011/0225321 | A1 | 9/2011 | Vorobyev | |

(Continued)

FOREIGN PATENT DOCUMENTS

| | | |
|---|---|---|
| JP | 2011-191989 | 9/2011 |
| JP | 2012-116111 | 6/2012 |

*Primary Examiner* — Ji H Bae
(74) *Attorney, Agent, or Firm* — Oblon, McClelland, Maier & Neustadt, L.L.P.

(57) ABSTRACT

An electronic device is connected to a server device. The electronic device includes: a detection unit that detects a state of the electronic device; a generation unit that generates third information in which first information that is information indicating the state of the electronic device and second information that is information indicating time of detection by the detection unit are associated with each other; a registration unit that registers the third information in a memory unit in order of generation; and a control unit that performs, when power supply to the electronic device is started, control to transmit latest third information among one or more pieces of the third information stored in the memory unit, to the server device, as stop information related to time at which the electronic device was stopped.

5 Claims, 6 Drawing Sheets

(56) References Cited

U.S. PATENT DOCUMENTS

| | | | |
|---|---|---|---|
| 2011/0307746 A1* | 12/2011 | Sullivan | G06F 11/3062 714/57 |
| 2012/0140273 A1 | 6/2012 | Vorobyev | |
| 2014/0173309 A1* | 6/2014 | Iwai | G06F 1/28 713/320 |
| 2015/0006934 A1* | 1/2015 | Mizuura | G06F 11/32 713/323 |

* cited by examiner

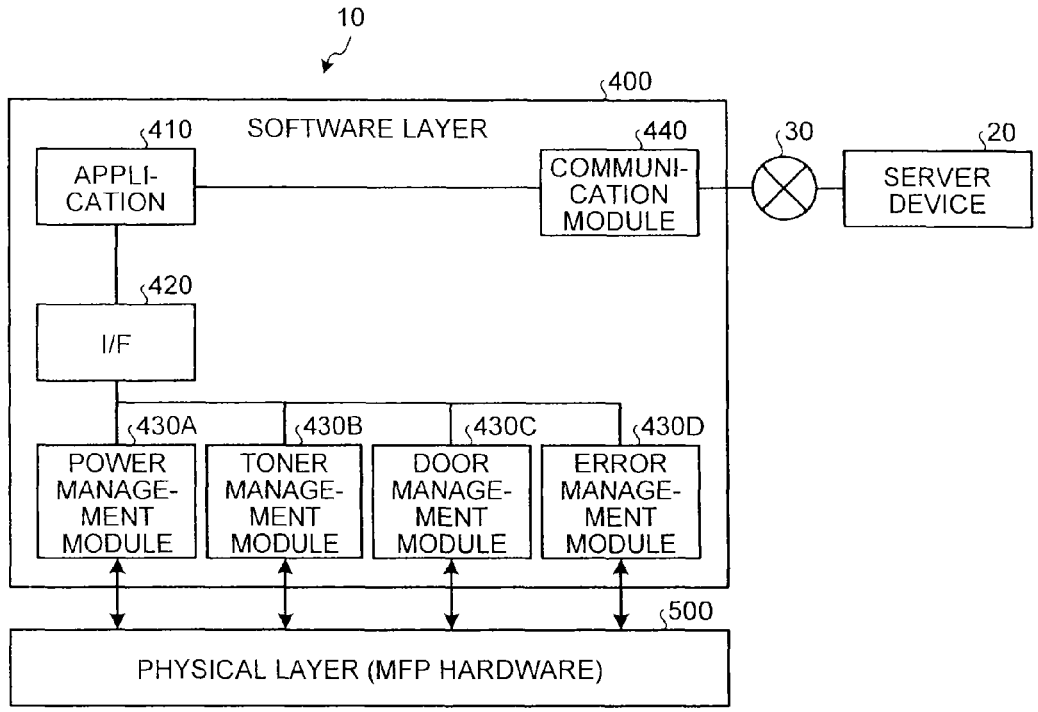
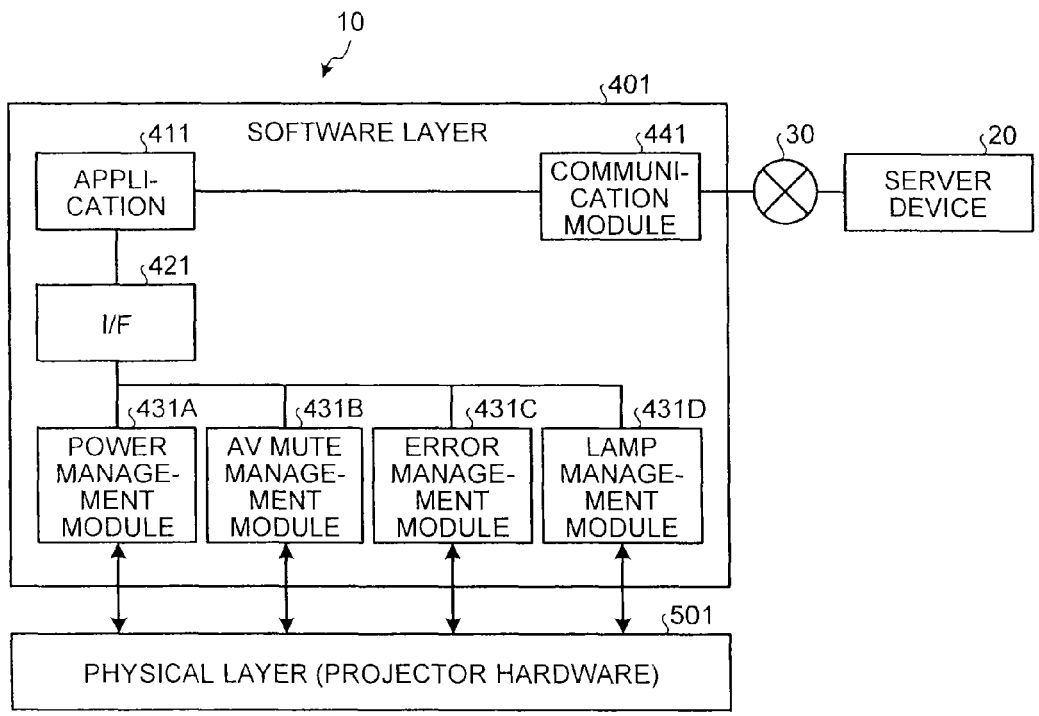

DEVICE, METHOD, AND SYSTEM FOR REPORTING DEVICE STATE INFORMATION TO A SERVER

CROSS-REFERENCE TO RELATED APPLICATION(S)

The present application claims priority to and incorporates by reference the entire contents of Japanese Patent Application No. 2013-156949 filed in Japan on Jul. 29, 2013.

BACKGROUND OF THE INVENTION

1. Field of the Invention

The present invention relates to an electronic device, a control method, and a system.

2. Description of the Related Art

Conventionally, there is known a system in which a plurality of electronic devices such as printers and a server device are connected to each other through a given data transmission path such as a network. There is known the form of such a system in which the server device accesses each of electronic devices periodically to acquire information of the state of each electronic device. For example, the server device acquires information of the power state of each electronic device, and can create, based on the acquired information, a report indicating a temporal change in the power consumption of each electronic device. Conventional examples are described in Japanese Patent Application Laid-open No. 2011-191989 and Japanese Patent Application Laid-open No. 2012-116111.

However, when the number of electronic devices controlled by the server device is huge, or when the electronic devices controlled by the server device are provided in a plurality of countries, it is difficult that the server device accesses each of electronic devices with a sufficient frequency, and the period in which each electronic device is not accessed by the server device becomes long.

Consequently, even when the server device accesses an electronic device and detects that the electronic device has been stopped (the power supply to the electronic device has been stopped), it cannot grasp the time at which the electronic device was stopped or the power state of the electronic device immediately before it was stopped, for example.

Moreover, the electronic device does not have a mechanism of notifying the server device of information related to the time at which the electronic device was stopped (information allowing estimation of the time at which the electronic device was stopped or the power state immediately before the electronic device was stopped, for example).

In view of the above aspects, there is a need to provide an electronic device, a control method, a computer program, and a system that can improve the function of managing the state of the electronic device.

SUMMARY OF THE INVENTION

It is an object of the present invention to at least partially solve the problems in the conventional technology.

An electronic device is connected to a server device. The electronic device includes: a detection unit that detects a state of the electronic device; a generation unit that generates third information in which first information that is information indicating the state of the electronic device and second information that is information indicating time of detection by the detection unit are associated with each other; a registration unit that registers the third information in a memory unit in order of generation; and a control unit that performs, when power supply to the electronic device is started, control to transmit latest third information among one or more pieces of the third information stored in the memory unit, to the server device, as stop information related to time at which the electronic device was stopped.

A control method includes: detecting a state of an electronic device connected to a server device; generating third information in which first information that is information indicating the state of the electronic device and second information that is information indicating time of detection at the detecting are associated with each other; registering the third information in a memory unit in order of generation; and performing, when power supply to the electronic device is started, control to transmit latest third information among one or more pieces of the third information stored in the memory unit, to the server device, as stop information related to time at which the electronic device was stopped.

A system includes: a computer program product and a server device. The computer program product includes a non-transitory computer-readable medium containing an information processing program. The program causes a computer included in an electronic device to execute: detecting a state of the electronic device connected to the server device, generating third information in which first information that is information indicating the state of the electronic device and second information that is information indicating time of detection at the detecting are associated with each other, registering the third information in a memory unit in order of generation, and performing, when power supply to the electronic device is started, control to transmit latest third information among one or more pieces of the third information stored in the memory unit, to the server device, as stop information related to time at which the electronic device was stopped. The server device that performs processing based on the third information received from the electronic device.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 9 is a schematic view illustrating the relation between a software layer and a physical layer of a multi-function peripheral (MFP);

FIG. 10 is a schematic view illustrating the relation between a software layer and a physical layer of a projector.

DETAILED DESCRIPTION OF THE PREFERRED EMBODIMENTS

In the following, the embodiments of an electronic device, a control method, a computer program, and a system according to the invention will be described in detail with reference to the enclosed drawings.

Figure 1:
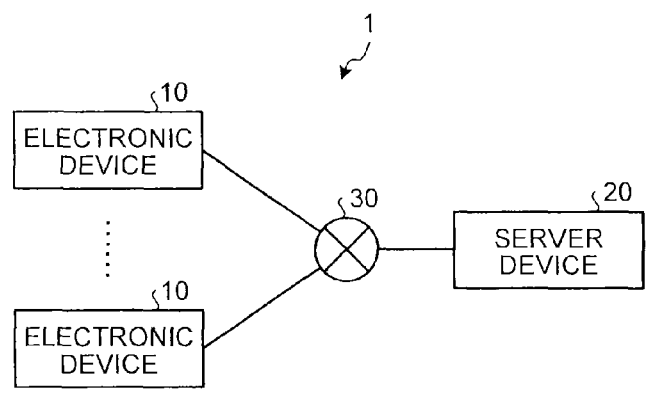
FIG. 1 is a diagram illustrating a configuration example of a system to which the embodiment is applied.

FIG. 1 is a diagram illustrating a configuration of a system 1 to which the invention is applied. As illustrated in FIG. 1, the system 1 includes a plurality of electronic devices 10 and a server device 20. Each of the electronic devices 10 and the server device 20 are connected to each other through a network 30 such as the Internet.

Figure 2:
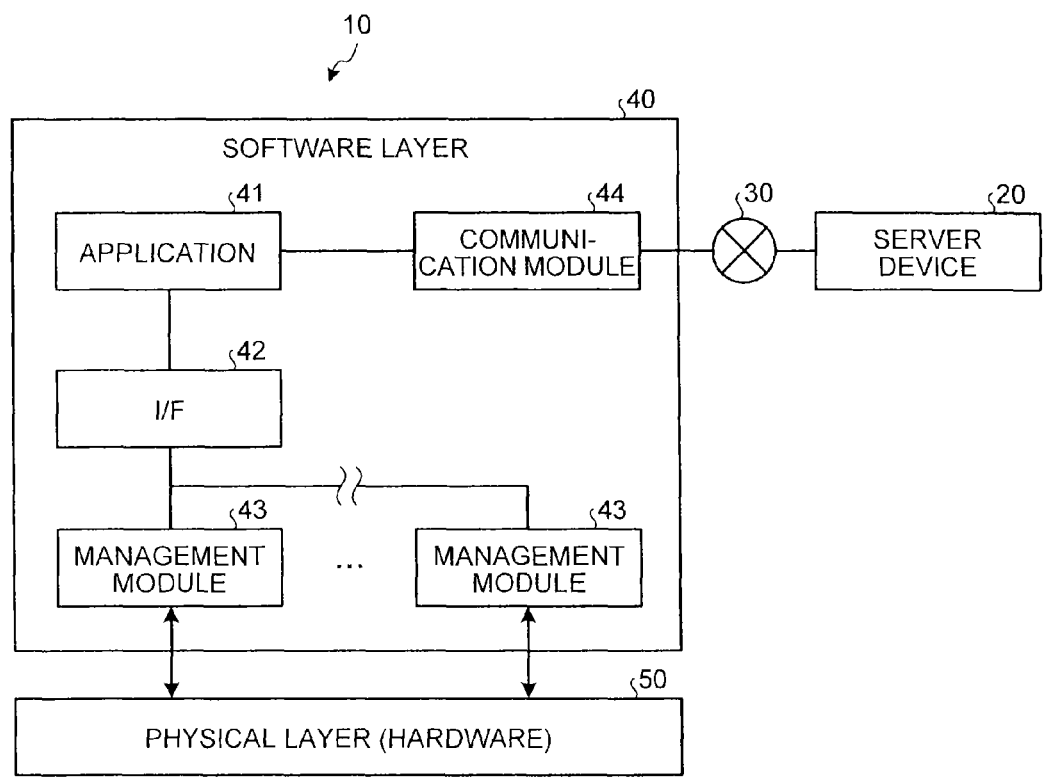
FIG. 2 is a schematic view illustrating the relation between a software layer and a physical layer of an electronic device to which the embodiment is applied.

FIG. 2 is a diagram schematically illustrating the relation between a software layer 40 and a physical layer (hardware) 50 of the electronic device 10. Although one electronic device 10 is exemplified here, the same can be applied also to other electronic devices 10. As illustrated in FIG. 2, the software layer 40 includes an application 41, an interface (I/F) 42, a plurality of management modules 43, and a communication module 44.

The application 41 is software for performing control to collect information indicating the state of the electronic device 10 and transmit the collected information to the server device 20. Here, the state of the electronic device 10 includes at least a power state indicating the state of power supply to the electronic device 10. In this example, the application 41 can perform communication with the management modules 43 through the I/F 42, and acquires, from each management module 43, information indicating the state of the electronic device 10 managed by the management module 43.

The I/F 42 is software for mediating between the application 41 and each of the management modules 43. Each management module 43 has the function of managing the state of the electronic device 10 corresponding to the management module 43 (to be managed by the management module 43). Here, at least the management module 43 managing the power state of the electronic device 10 is provided. Each management module 43 may have the function of accessing the physical layer 50 if necessary. For example, the management module 43 managing the power state of the electronic device 10 can grasp the power state of the electronic device 10 by acquiring, from a sensor (an element included in the physical layer 50) detecting power of each portion of the electronic device 10, information detected by the sensor.

Note that the power state of the electronic device 10 includes at least a first state (normal state) in which power is supplied to all of the parts included in the electronic device 10 (a central processing unit (CPU) and a memory, for example) and a second state (low power consumption state) with lower power consumption than that in the first state. However, the power state of the electronic device 10 is not limited thereto. An example of the second state includes a state in which power supply to some of the parts included in the electronic device 10 is stopped, for example. Here, the power state of the electronic device 10 can be set variable, and can be set to the first state, the second state, or another power state.

The communication module 44 is software for performing communication with the server device 20 through the network 30. The electronic device 10 and the server device 20 perform bidirectional communication using a communication protocol such as a simple object access protocol (SOAP), for example.

Figure 3:
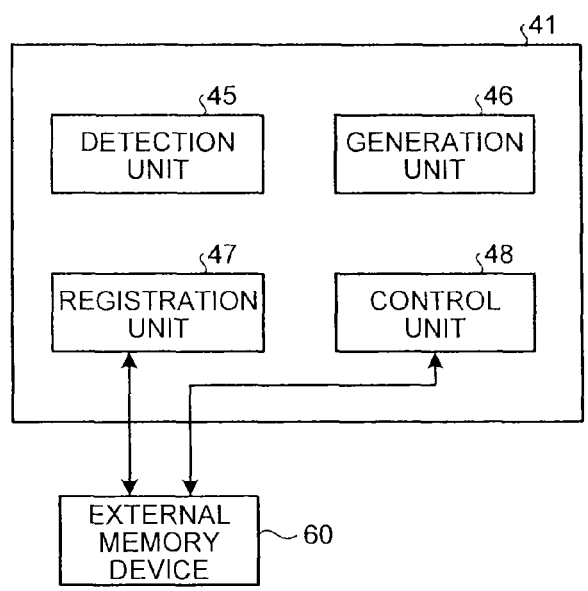
FIG. 3 is a block diagram illustrating an example of a functional configuration of an application.

FIG. 3 is a block diagram illustrating an example of a functional configuration of the application 41. As illustrated in FIG. 3, the application 41 includes a detection unit 45, a generation unit 46, a registration unit 47, and a control unit 48.

The detection unit 45 has the function of detecting the state of the electronic device 10. The detection unit 45 performs processing (polling processing) of inquiring of each management module 43 the state of the electronic device 10 managed by the management module 43, in a given cycle. Thus, the detection unit 45 can acquire information indicating the state of the electronic device 10 managed by each management module 43. Note that any given cycle can be arbitrarily set, and the polling processing may be performed every five seconds, for example. The detection unit 45 also has the function of detecting a state change in the electronic device 10 based on the result of polling processing.

The generation unit 46 generates third information in which first information that is information indicating the state of the electronic device 10 and second information that is information indicating time of the detection by the detection unit 45 (detection time) are associated with each other. That is, every time the detection unit 45 performs detection, the generation unit 46 generates the third information in which the first information indicating the detected state of the electronic device 10 and the second information indicating the detection time are associated with each other. Here, the state of the electronic device 10 includes at least a power state indicating the state of power supply to the electronic device 10. That is, the first information includes at least information indicating the power state of the electronic device 10. Note that the first information may include only information indicating the power state of the electronic device 10, or may include information indicating the power state and information indicating a state other than the power state.

Figure 4:
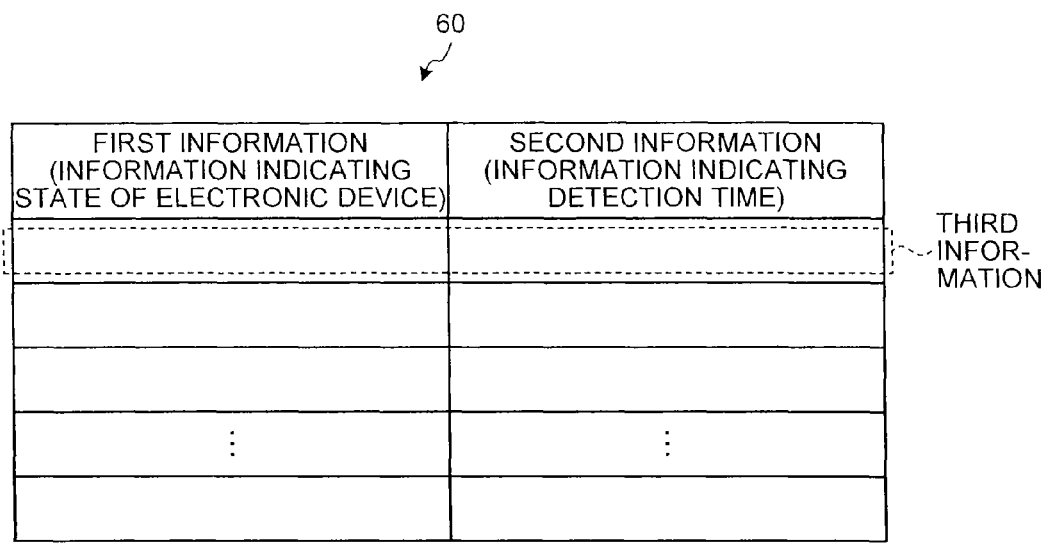
FIG. 4 is a schematic view illustrating an example of a data structure in an external memory device.

The registration unit 47 registers the third information in an external memory device 60 in the order of generation. That is, the registration unit 47 has the function of sequentially registering, every time the generation unit 46 generates third information, the generated third information in the external memory device 60. The external memory device 60 is constituted by a nonvolatile memory, and can be constituted by a secure digital (SD) memory card, for example. In this example, the external memory device 60 corresponds to the "memory unit" in claims. FIG. 4 is a diagram schematically illustrating a data structure in the external memory device 60.

The control unit 48 has the function of performing, when power supply to the electronic device 10 is started (when the electronic device 10 is activated), control to transmit the latest third information among one or more pieces of third information stored in the external memory device 60, to the server device 20, as stop information related to the time at which the electronic device 10 was stopped (event information of "power off"). Here, the control unit 48 also has the function of accessing, when the electronic device 10 is activated, the external memory device 60 to read out the latest third information. The control unit 48 performs control to transmit the read latest third information to the server device 20 as event information of "power off". However, the embodiment is not limited thereto, and an element other than the control unit 48 may have such a reading-out function. Note that the latest third information can be also considered as third information including second information indicating time with smallest interval from activation time.

Moreover, when power supply to the electronic device 10 is started, the control unit 48 performs control to transmit the third information in which the first information indicating the state of the electronic device 10 detected after the start of power supply (including at least the power state) and the second information indicating the detection time are associated with each other, to the server device 20, as activation information related to the time at which the electronic device 10 was activated (event information of "power on").

Furthermore, the control unit 48 performs, when the detection unit 45 detects a change in the power state of the electronic device 10, control to transmit the third information in which the first information indicating the power state after the change and the second information indicating the time at which the power state after the change is detected are associated with each other, to the server device 20.

Note that the hardware configuration of the electronic device 10 is a hardware configuration of a normal computer including a CPU, a read only memory (ROM), a random access memory (RAM), and a communication I/F device, for example. The CPU loads a computer program stored in the ROM onto the RAM and executes it, whereby the functions (the detection unit 45, the generation unit 46, the registration unit 47, and the control unit 48) of the above-described application 41 are achieved. The embodiment is not limited thereto, and at least one part of the functions of the above-described application 41 can be implemented with a dedicated hardware circuit (a semiconductor integrated circuit, for example), for example.

Figure 5:
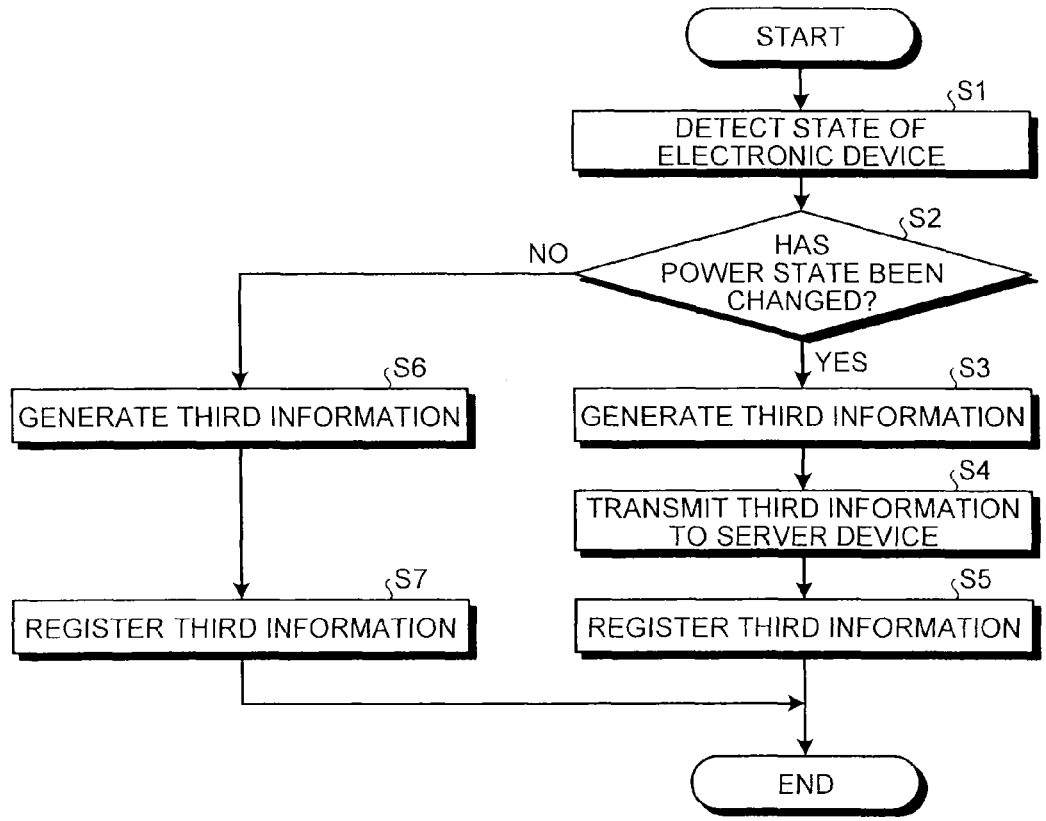
FIG. 5 is a flowchart illustrating an operation example of the electronic device.

FIG. 5 is a flowchart illustrating an example of processing performed by the electronic device 10 in a given cycle (five seconds, for example). As illustrated in FIG. 5, the electronic device 10 (detection unit 45) detects the state of the electronic device 10 by performing polling processing described above (Step S1). Next, the electronic device 10 (detection unit 45) determines whether the power state of the electronic device 10 has been changed (Step S2). When it is determined that the power state has been changed (Yes at Step S2), the electronic device 10 (generation unit 46) generates third information in which the first information indicating the power state after the change and the second information indicating the detection time of the power state after the change are associated with each other (Step S3). The electronic device 10 (control unit 48) performs control to transmit the third information generated at Step S3 to the server device 20 (Step S4). Next, the electronic device 10 (registration unit 47) registers the third information generated at Step S3 in the external memory device 60 (Step S5).

When it is determined at above-described Step S2 that the power state has not been changed (No at Step S2), the electronic device 10 (generation unit 46) generates third information in which the first information indicating the state of the electronic device 10 detected at the above-described Step S1 and the second information indicating the detection time are associated with each other (Step S6). Next, the electronic device 10 (registration unit 47) registers the third information generated at Step S6 in the external memory device 60 (Step S7).

Figure 6:
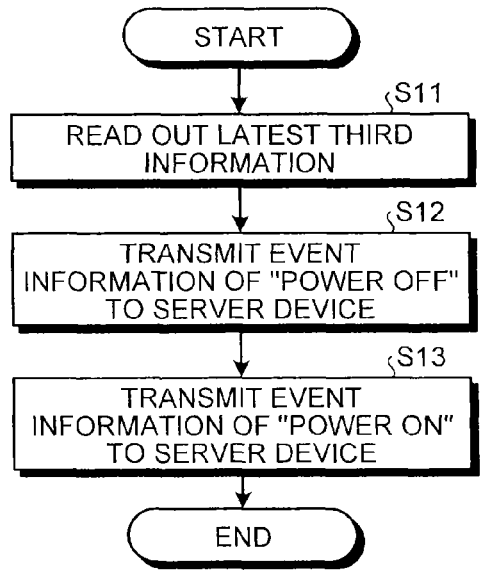
FIG. 6 is a flowchart illustrating an operation example of the electronic device.

FIG. 6 is a flowchart illustrating an operation example of the electronic device 10 after activation. As illustrated in FIG. 6, after activation (immediately after activation, for example), the electronic device 10 (control unit 48) first accesses the external memory device 60 to read out the latest third information (Step S11). Next, the electronic device 10 (control unit 48) performs control to transmit the third information read out at the above-described Step S11 to the server device 20 as event information of "power off" (Step S12). Moreover, the electronic device 10 (control unit 48) performs control to transmit the third information in which the first information indicating the state of the electronic device 10 detected after activation and the second information indicating the detection time are associated with each other, to the server device 20, as activation information (event information of "power on") of the electronic device 10 (Step S13).

As described above, the electronic device 10 to which the invention is applied detects the state of the electronic device 10 periodically, and generates, every time the state of the electronic device 10 is detected, third information in which the first information indicating the detected state of the electronic device 10 and the second information indicating the detection time are associated with each other, and registers the third information in the external memory device 60 in the order of generation. The electronic device 10 reads out the latest third information (third information with smallest elapsed time from its registration) when activated, and transmits the read latest third information to the server device 20 as stop information related to the time at which the electronic device 10 was stopped. In this manner, the server device 20 can specify (estimate) the time indicated by the second information contained in the stop information notified by the electronic device 10 as the time at which the electronic device 10 was stopped, and also specify the state of the electronic device 10 indicated by the first information contained in the stop information notified by the electronic device 10 as the state of the electronic device 10 immediately before it was stopped. Therefore, in creating information (a report) indicating a temporal change in the power consumption of the electronic device 10, for example, the server device 20 can create a report accurately reflecting the actual power state of the electronic device 10.

Figure 7:
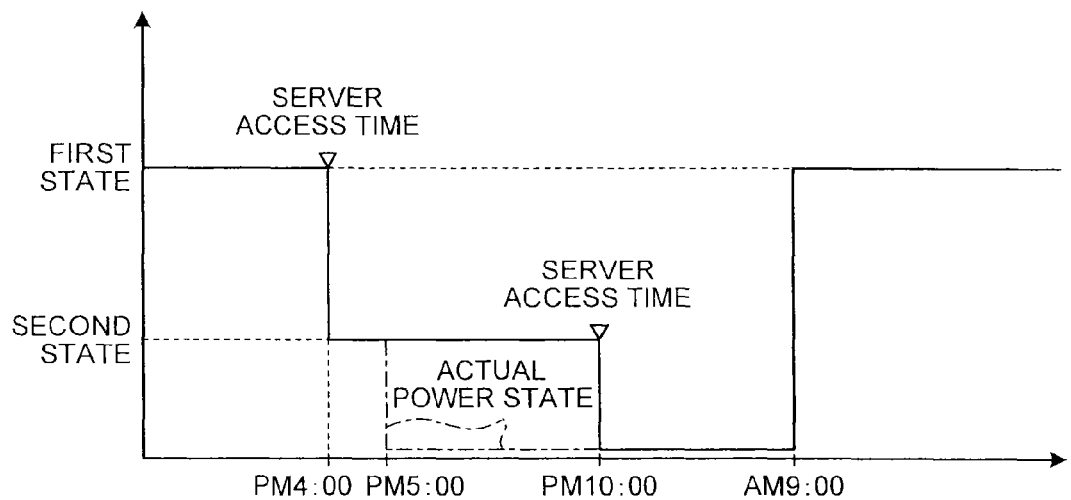
FIG. 7 is a diagram for explaining a comparative example.

Here, a form in which the server device accesses each electronic device periodically to manage the state of the electronic device as in a conventional manner is supposed as a comparative example. Hereinafter, the explanation will be given with an electronic device 100 and a server device 200 in the comparative example. In the example of FIG. 7, the power state of the electronic device 100 in the comparative example was shifted from the first state to the second state at 4 p.m. Moreover, a user performed an operation of instructing the stop of power supply to the electronic device 100 (an operation of pressing down a power switch (not illustrated), for example) at 5 p.m., and performed an operation of instructing the start of power supply to the electronic device 100 (an operation of pressing down the power switch (not illustrated), for example) at 9 a.m. of the next day. Thus, the power state of the electronic device 100 between 5 p.m. and 9 a.m. of the next day was a power off state indicating that the power supply was stopped.

Meanwhile, the server device 200 in the comparative example accessed the electronic device 100 at each time of 4 p.m. and 10 p.m. (date is omitted). It is supposed that the electronic device 100 in the comparative example has the function of transmitting, when power supply to the electronic device 100 is started (activated), activation information in which information indicating the state of the electronic device 100 after the activation and information indicating the activation time are associated with each other, to the server device 200.

In the example of FIG. 7, the server device 200 accessed the electronic device 100 at 4 p.m. at which the power state of the electronic device 100 was shifted from the first state to the second state. Thus, the server device 200 could accurately grasp the time at which the power state of the electronic device 100 was shifted from the first state to the second state. However, the server device 200 did not access the electronic device 100 at 5 p.m. at which the power state of the electronic device 100 was shifted to the power off state, and the next access of the server device 200 to the electronic device 100 was at 10 p.m. Therefore, the server device 200 detected, in accessing the electronic device 100 at 10 p.m., that the electronic device 10 had been shifted to the power off state, and regarded that the power state of the electronic device 100 was shifted to the power off state at 10 p.m., thus causing deviation from the actual change in the power state of the electronic device 100.

By contrast, the electronic device 10 to which the embodiment is applied detects the state of the electronic device 10 with an interval (five seconds, for example) sufficiently shorter than an interval with which the server device 200 in the comparative example accesses the electronic device 100, and generates, every time the detection is performed, third information in which the first information indicating the detected state of the electronic device 10 and the second information indicating the detection time are associated with each other, and registers the third information in the external memory device 60 in the order of generation. The electronic device 10 transmits, when activated, the latest third information registered in the external memory device 60 to the server device 20 as stop information related to the time at which the electronic device 10 was stopped.

Figure 8:
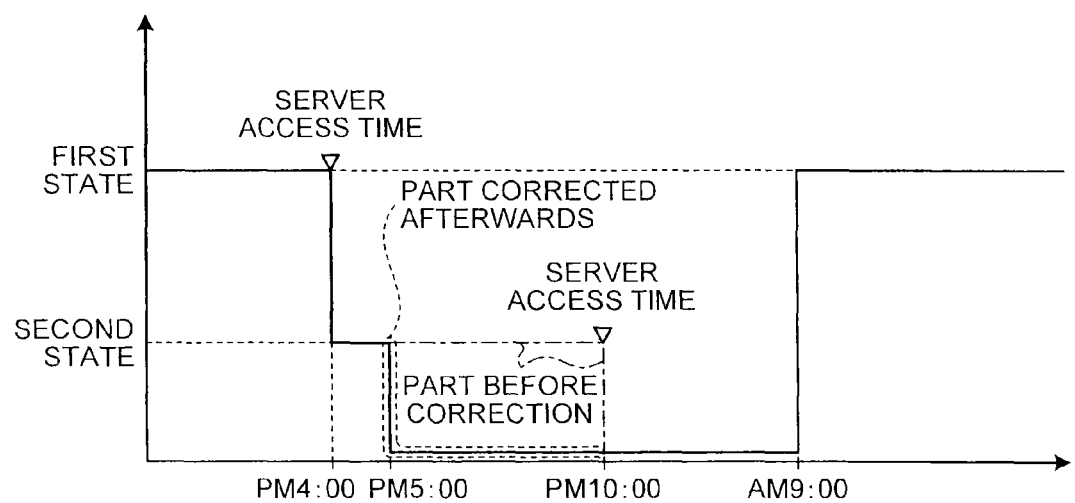
FIG. 8 is a diagram for explaining an effect of the embodiment.

In the example of FIG. 8, the electronic device 10 has registered, in the external memory device 60, the power state thereof until time immediately before 5 p.m. at which the electronic device 10 was shifted to the power off state. The electronic device 10 transmitted, when activated at 9 a.m. of the next day, the latest third information, that is, third information including second information indicating time with smallest interval from the activation time (polling time that was most proximate to 5 p.m. of the previous day in the example of FIG. 8), to the server device 20, as stop information related to the time at which the electronic device 10 was stopped. Thus, the server device 20 can specify (estimate) the time indicated by the second information contained in the stop information notified by the electronic device 10 as the time at which the electronic device 10 was stopped. The server device 10 can also specify the power state of the electronic device 10 indicated by the first information contained in the stop information notified by the electronic device 10 as the state of the electronic device 10 immediately before it was stopped. In this manner, as illustrated in FIG. 8, the server device 20 can correct (correct afterward) information indicating a temporal change in the power consumption of the electronic device 10 to a form closer to the actual change. Therefore, it is possible to create a report with higher accuracy, as compared with the comparative example.

Example of Electronic Device

MFP

Note that the embodiment is applicable to any kind of the electronic device 10. The electronic device 10 to which the embodiment is applied may be a multifunction peripheral (MFP), for example. In the following, the MFP to which the embodiment is applied is explained as an "MFP 10". Note that the MFP is a device having at least two functions among a printing function, a copying function, a scanning function, and a facsimile function.

FIG. 9 is a diagram schematically illustrating the relation between a software layer 400 and a physical layer (hardware) 500 of the MFP 10 to which the embodiment is applied. As illustrated in FIG. 9, the software layer 400 includes an application 410, an I/F 420, a plurality of management modules 430 (430A to 430D), and a communication module 440.

The function of the application 410 is similar to the function of the application 41 described above. The function of the I/F 420 is similar to the function of the I/F 42 described above. The function of the communication module 440 is similar to the function of the communication module 44 described above.

In the example of FIG. 9, a power management module 430A, a toner management module 430B, a door management module 430C, and an error management module 430D are provided as the management modules 430.

The power management module 430A manages (grasps) the power state of the MFP 10. The power state of the MFP 10 includes a first state in which power is supplied to all of the parts included in the MFP 10 such as an engine, a controller, a CPU, and a memory, and a second state in which power supply to some of the parts is stopped, for example.

The toner management module 430B manages the state of toner such as a toner residual amount. The door management module 430C manages the opening and closing state of a door covering toner, for example, that is stored in the body of the MFP 10. The error management module 430D manages the state of an error that has occurred in the MFP 10. For example, the error management module 43D manages the presence or absence of occurrence of an error requiring an agent (a service person) for repair.

Example of Electronic Device

Projector

The electronic device 10 to which the embodiment is applied may be a projector that projects an image on a projection surface such as a screen. In the following, the projector to which the embodiment is applied is explained as a "projector 10".

FIG. 10 is a diagram schematically illustrating the relation between a software layer 401 and a physical layer (hardware) 501 of the projector 10 to which the embodiment is applied. As illustrated in FIG. 10, the software layer 401 includes an application 411, an I/F 421, a plurality of management modules 431 (431A to 431D), and a communication module 441.

The function of the application 411 is similar to the function of the application 41 described above. The function of the I/F 421 is similar to the function of the I/F 42 described above. The function of the communication module 441 is similar to the function of the communication module 44 described above.

In the example of FIG. 10, a power management module 431A, an AV mute management module 431B, an error management module 431C, and a lamp management module 431D are provided as the management modules 431. These management modules 431 can acquire information of the states to be managed by the management modules 431, conforming to the PJLink standard.

The power management module 431A manages the power state of the projector 10. The AV mute management module 431B manages the state of an AV mute (the function of hiding video on a screen) used for causing the audience to concentrate on a speech or for prevent the audience from viewing an operation of switching files to be projected, for example. The error management module 431C manages the state of an error that has occurred in the projector 10. The lamp management module 431D manages the number of lamps and lamp time.

Note that the management modules 431 are not limited to ones in the example of FIG. 10. For example, there may be further provided one or more management modules 431 capable of acquiring, conforming to the PJLink standard, information indicating input switching of the projector 10, information indicating a list of input switching, information indicating a projector name, information indicating a manufacturer name, information indicating a model name, and other kinds of information.

Example of Electronic Device

Teleconference Terminal

The electronic device 10 to which the embodiment is applied may be a terminal (hereinafter, referred to as a "teleconference terminal") used in a teleconference system (also referred to as a video conference system or a television conference system, for example) in which a large capacity of conference data such as video data and voice data is transmitted and received in real time through a network. In the following, the teleconference terminal to which the embodiment is applied is explained as a "teleconference terminal 10".

Figure 11:
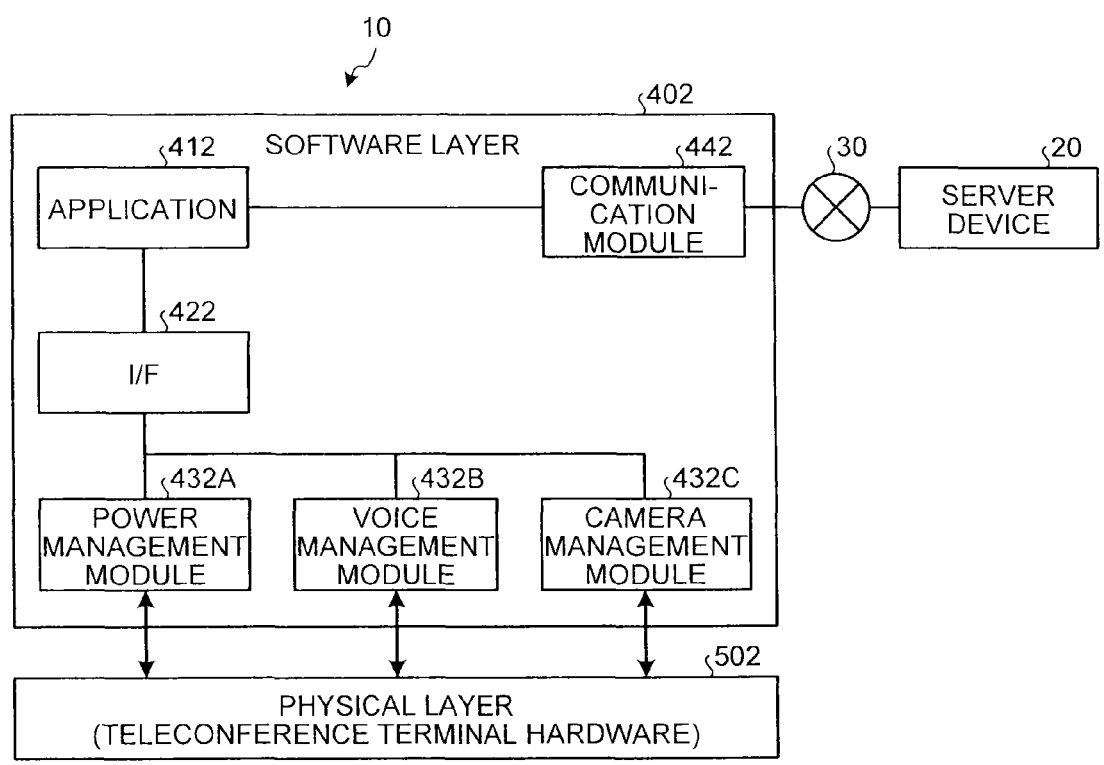
FIG. 11 is a schematic view illustrating the relation between a software layer and a physical layer of a teleconference terminal.

FIG. 11 is a diagram schematically illustrating the relation between a software layer 402 and a physical layer (hardware) 502 of the teleconference terminal 10 to which the embodiment is applied. As illustrated in FIG. 11, the software layer 402 includes an application 412, an I/F 422, a plurality of management modules 432 (432A to 432D), and a communication module 442.

The function of the application 412 is similar to the function of the application 41 described above. The function of the I/F 422 is similar to the function of the I/F 42 described above. The function of the communication module 442 is similar to the function of the communication module 44 described above.

In the example of FIG. 11, a power management module 432A, a voice management module 432B, and a camera management module 432C are provided as the management modules 432. The power management module 431A manages the power state of the teleconference terminal 10. The voice management module 432B manages the state of a microphone (one example of a voice input device) that inputs voice uttered by a participant in a conference using the teleconference terminal 10. The camera management module 432C manages the state of a camera (an image capturing device) that captures an image of a participant (one example of an object to be imaged by a camera) in a conference using the teleconference terminal 10.

Note that the management modules 432 are not limited to ones in the example of FIG. 11. The management module 432 managing the state of a network used in a teleconference may be further provided.

A computer program executed by the electronic device 10 described above may be recorded and provided in a computer-readable recording medium such as a compact disc read only memory (CD-ROM), a flexible disk (FD), a compact disc recordable (CD-R), a digital versatile disc (DVD), and a universal serial bus (USB), as an installable or executable file, or may be provided or distributed via a network such as the Internet. Moreover, various programs may be embedded and provided in a ROM, for example.

An aspect of the present invention can improve the function of managing the state of an electronic device.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An electronic device connected to a server device, the electronic device comprising:
   processing circuitry programmed to
      detect a state of the electronic device,
      generate third information in which first information that is information indicating the state of the electronic device and second information that is information indicating time of detection are associated with each other,
      register the third information in a memory in order of generation,
      perform, when power supply to the electronic device is started, control to transmit latest third information among one or more pieces of the third information stored in the memory, to the server device, as stop information related to time at which the electronic device was stopped, and
      perform, when the power supply to the electronic device is started, control to further transmit third information having first information indicating the state of the electronic device detected after the start of power supply and second information indicating a detection time associated with each other, to the server device, as activation information related to time at which the electronic device was activated.

2. The electronic device according to claim 1, wherein the processing circuitry is programmed to perform periodic detection of the state of the electronic device and periodically generates the third information for registration in the memory.

3. The electronic device according to claim 1, wherein the state of the electronic device includes at least a power state indicating a state of power supply to the electronic device.

4. A control method, comprising:
   detecting a state of an electronic device connected to a server device;
   generating, via processing circuitry, third information in which first information that is information indicating the state of the electronic device and second information that is information indicating time of detection at the detecting are associated with each other;
   registering the third information in a memory in order of generation;
   performing, when power supply to the electronic device is started and via the processing circuitry, control to transmit latest third information among one or more pieces of the third information stored in the memory, to the server device, as stop information related to time at which the electronic device was stopped; and performing, when the power supply to the electronic device is started, control to further transmit third information having first information indicating the state of the electronic device detected after the start of power supply and second information indicating a detection time associated with each other, to the server device, as activation information related to time at which the electronic device was activated.

5. A non-transitory computer-readable medium having computer-readable instructions thereon which when executed by a computer cause the computer to perform a method comprising:
  detecting a state of an electronic device connected to a server device;
  generating third information in which first information that is information indicating the state of the electronic device and second information that is information indicating time of detection at the detecting are associated with each other;
  registering the third information in a memory in order of generation;
  performing, when power supply to the electronic device is started, control to transmit latest third information among one or more pieces of the third information stored in the memory, to the server device, as stop information related to time at which the electronic device was stopped;
  performing, when the power supply to the electronic device is started, control to further transmit third information having first information indicating the state of the electronic device detected after the start of power supply and second information indicating a detection time associated with each other, to the server device, as activation information related to time at which the electronic device was activated; and
  performing processing based on the third information received from the electronic device.

* * * * *